(12) United States Patent
Mao et al.

(10) Patent No.: US 8,496,527 B2
(45) Date of Patent: Jul. 30, 2013

(54) CAPACITIVE INPUT FOR COMPUTER PROGRAM

(75) Inventors: Xiaodong Mao, Foster City, CA (US); Noam Rimon, Redwood City, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 535 days.

(21) Appl. No.: 12/792,567

(22) Filed: Jun. 2, 2010

(65) Prior Publication Data
US 2011/0300938 A1    Dec. 8, 2011

(51) Int. Cl.
*G06F 17/00*    (2006.01)

(52) U.S. Cl.
USPC .................................. 463/36; 463/7

(58) Field of Classification Search
USPC ................ 463/7, 36; 84/465, 470 R
See application file for complete search history.

(56) References Cited

U.S. PATENT DOCUMENTS

| | | | | |
|---|---|---|---|---|
| 3,646,372 | A * | 2/1972 | Snellman et al. | 307/116 |
| 5,565,658 | A | 10/1996 | Gerpheide et al. | |
| 6,410,835 | B2 * | 6/2002 | Suzuki et al. | 84/464 R |
| 7,854,686 | B2 * | 12/2010 | Mar et al. | 482/8 |
| 7,871,321 | B2 * | 1/2011 | Hofmann | 463/7 |
| 8,330,735 | B2 * | 12/2012 | Lin et al. | 345/173 |
| 2001/0005692 | A1 * | 6/2001 | Song | 463/43 |
| 2008/0004111 | A1 * | 1/2008 | Prather et al. | 463/36 |
| 2008/0039199 | A1 * | 2/2008 | Baer et al. | 463/36 |
| 2010/0022287 | A1 * | 1/2010 | Chiwata | 463/7 |
| 2010/0041454 | A1 * | 2/2010 | Huang | 463/7 |
| 2010/0285925 | A1 * | 11/2010 | Pierce et al. | 482/8 |
| 2011/0298452 | A1 | 12/2011 | Mao | |
| 2011/0300939 | A1 | 12/2011 | Mao | |
| 2012/0055320 | A1 * | 3/2012 | Morong | 84/746 |

FOREIGN PATENT DOCUMENTS

| | | |
|---|---|---|
| jp | 11-505641 | 5/1999 |
| JP | 11-212716 | 8/1999 |
| JP | 2008-152640 | 7/2008 |

OTHER PUBLICATIONS

Notification of Reasons for Refusal dated Apr. 24, 2012 in Japanese Patent Application No. 2011-121647.
Decision Refusal dated Nov. 20, 2012 in Japanese Patent Application No. 2011-121647.

* cited by examiner

*Primary Examiner* — Michael Cuff
(74) *Attorney, Agent, or Firm* — Joshua D. Isenberg; JDI Patent

(57) ABSTRACT

A capacitive input apparatus and method are disclosed. The apparatus includes a mat and a probe. The mat has a dielectric layer sandwiched between a common conductive layer and a patterned conductive layer having a grid pattern containing plural conductive regions. Each conductive region is selectively coupled to a corresponding capacitance sensor that is responsive to a signal capacitively coupled to a corresponding one of the conductive regions. The probe can be worn on a user's feet and can change a capacitive coupling of the signal. A degree of the change of the signal varies with a degree of proximity of the probe to the corresponding one of the conductive regions. In the method, a capacitive coupling of the signal can be changed with the probe. Measurements collected from the capacitance sensor can provide input to a computer program based on values of one or more measurements.

33 Claims, 6 Drawing Sheets

Unguarded electric field

Guarded conical electric field

CAPACITIVE INPUT FOR COMPUTER PROGRAM

CROSS-REFERENCE TO RELATED APPLICATION

This application is related to commonly-assigned, co-pending application Ser. No. 12/792,586, entitled "MAGNETIC INPUT FOR COMPUTER DEVICE" filed the same day as the present application, the entire disclosures of which are incorporated herein by reference.

This application is related to commonly-assigned, co-pending application Ser. No. 12/792,628, entitled "INPUT FOR COMPUTER DEVICE USING PATTERN-BASED COMPUTER VISION" filed the same day as the present application, the entire disclosures of which are incorporated herein by reference.

FIELD OF THE INVENTION

Embodiments of the present invention relate generally to computer entertainment devices and more particularly to a capacitive interface for a computer entertainment device.

BACKGROUND OF THE INVENTION

Video games have become a very popular form of entertainment. A typical video game utilizes an interface or controller to receive inputs from a user. A common type of controller is a hand-held controller that uses pushbuttons or joysticks to provide inputs. Another type of controller, commonly referred to as a "dance pad" is used with games based on dance. In a typical dance-based game a user is prompted to press selected buttons on the dance pad at specific times in response to some sort of visual indicator displayed on a video screen. In the dance pad, the control buttons are typically integrated into a plastic mat. The user can press different control buttons by stepping or dancing on corresponding areas of the mat.

A dance pad basically acts as a pushbutton controller that is operated with the feet as opposed to the hands. However, the dance pad does not track the proximity a user's feet.

It is within this context that embodiments of the invention arise.

BRIEF DESCRIPTION OF THE DRAWINGS

The teachings of the present invention can be readily understood by considering the following detailed description in conjunction with the accompanying drawings, in which.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

INTRODUCTION

Embodiments of the present invention utilize the concept of capacitive coupling, which is based on the electrical property of "capacitance". Capacitive coupling can be said to exist between two conductive surfaces that are in sufficiently close proximity with a dielectric material between them or sufficiently close to them. The degree of capacitive coupling is directly proportional to the areas of the conductive surfaces and the dielectric material between them, and inversely proportional to the distance between them.

Figure 1:
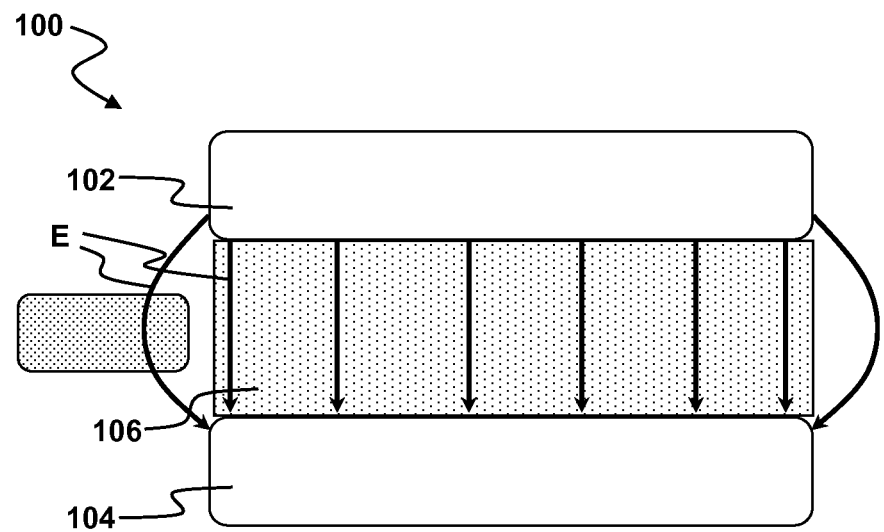
FIG. 1 is a schematic diagram illustrating the principle of capacitive sensing.

FIG. 1 illustrates the principle behind capacitive sensors that can be used in interfaces according to embodiments of the present invention. In general FIG. 1 depicts a capacitor 100 having a dielectric material 106 sandwiched between a first conductive plate 102 and a second conductive plate 104. In general, when a voltage is applied between the first and second conductive plates 102, 104 charges of opposite polarity build up on the plates and establish an electric field E. The capacitance of the capacitor 100 is defined as the ratio of the magnitude of the charge on either plate to the voltage between the plates. In general, the capacitance is directly proportional to the area of the plates and the dielectric constant of the material between the plates. The capacitance is inversely proportional to the distance between the plates.

Most of the electric field E is concentrated in the space between the two plates. However, for plates of finite size some electric field leaks out at the edges as indicated by the curved field lines. These curved field lines, sometimes referred to as fringing fields, can be disturbed by a placing an external dielectric material 108 in close proximity to the capacitor 100. The disturbance of the electric field E can change the measured capacitance of the capacitor 100.

When an alternating voltage is applied to the conductors, an electric field is created between them with positive and negative charges continually reversing. The alternating charges create an alternating electric current. The magnitude of the current is determined by the capacitance between the conductors, which depends on the dielectric material and conductive surfaces as mentioned above. Since the capacitance is determined by the size and proximity of the conductive objects to each other, larger and closer objects cause greater current than smaller and more distant objects.

Embodiments of the present invention apply the concept of capacitive coupling to a system for tracking a user's feet, e.g., in conjunction with a video game, such as a dance game.

To track the foot motion on a dancing mat, a probe sensor may be used as one of the conductive objects mounted on the user's foot, and a conductive pattern on the mat may be used as the other. To precisely detect the position (e.g., x, y, z) of the foot in the coordinates of the mat, each cell in the conductive pattern may be provided with separated and time-synchronized AC voltage. By detecting the proximity between a given "target cell" in the pattern and the probe sensor, the position of probe sensor (and hence the user's foot) can be calculated by triangulation over a set of detected proximities.

It is noted that embodiments of the present invention are not limited to versions in which the probe sensor is worn on a user's foot. The probe sensor may alternatively be worn or held on the user's hand or some other part of the user's body in order to track that part of the body or otherwise provide input to a computer program.

EMBODIMENTS

Figure 2:
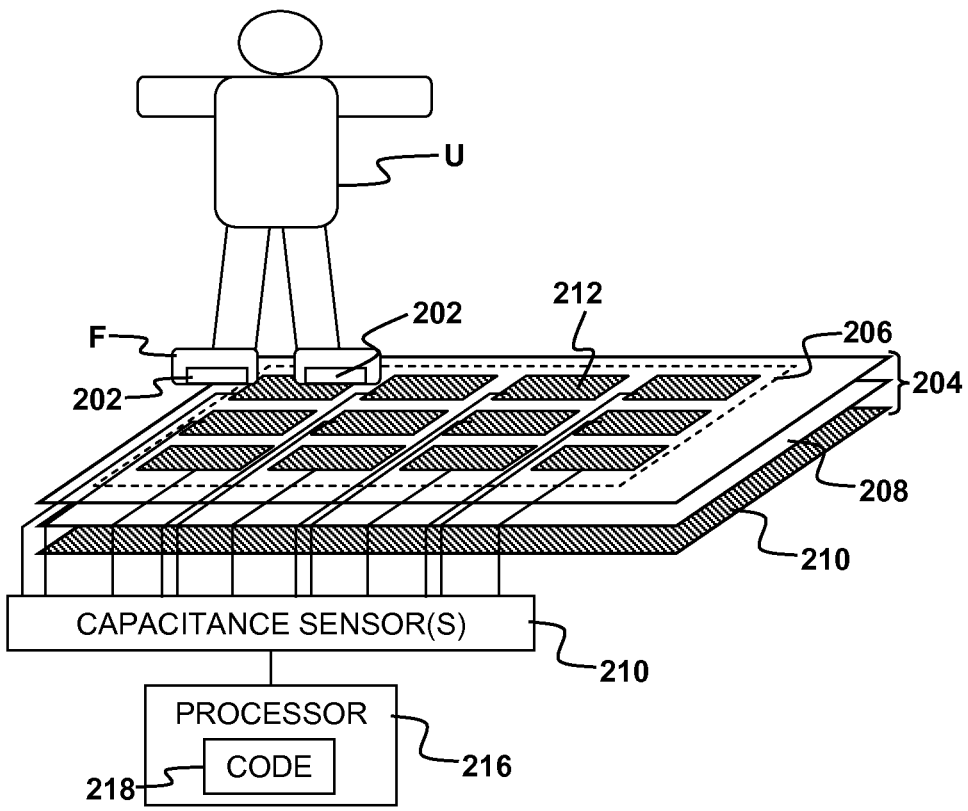
FIG. 2 is a schematic diagram illustrating an example of a capacitive interface according to an embodiment of the present invention.

According to an embodiment of the present invention depicted in FIG. 2, a capacitive input apparatus 200 for a computer entertainment device may include one or more probes 202 configured to be worn on the fee F of a user U and a mat 204 having a conductive pattern 206. The mat 204 may include a dielectric layer 208 sandwiched between the conductive pattern 206 and common conductive layer 210. The conductive pattern 206 can include a grid pattern containing a plurality of conductive regions 212. Each conductive region may be of generally rectangular shape a few centimeters on edge. The size and shape of each conductive region may be the same or similar to that of the probe 202. The conductive regions 212 may be electrically isolated from each other so that each conductive region 212 can be selectively coupled to a corresponding capacitance sensor 214. The capacitance sensor 214 can respond to a signal that is capacitively coupled to a corresponding one of the conductive regions 212. Each of the probes can be configured to change a capacitive coupling of the signal. The degree of change of the capacitive coupling can vary with a degree of proximity of the probe 202 to the corresponding one of the conductive regions 212.

By way of example, and not by way of limitation, the conductive pattern 206 may be a grid a pattern of conducive regions laid out on a flexible dance mat, e.g., using conductive ink. The mat can be made from any suitable flexible non-conductive material such as a polymer, rubber, cloth, mesh, or a composite material having layers of polymer, rubber, cloth or mesh. The conductive pattern 206 may be used in conjunction with the probe(s) 202 to sense foot motion, e.g. dancing, by tracking the player's foot proximity and position relative to the mat based on capacitive coupling effects between the probe on the user's feet and the conductive pattern 206 on the mat. Signals from the conductive pattern 206 resulting from proximity of the probe(s) 202 can be used by a processor 216, running suitable code 216 as a form of input.

The processor 216 may be coupled to the capacitance sensor 214, e.g., through an appropriate data acquisition circuit. The processor 216 can be configured, e.g., through suitable programming of the code 218, to determine a distance between the probe and one or more of the conductive regions from values of one or more measurements from the capacitance sensor. A value of a given measurement can depend on a capacitive coupling of the signal to a corresponding conductive region 212. The distance can be determined from the degree of capacitive coupling. In general, due to the inverse dependence of capacitance on distance, a stronger coupling indicates a smaller distance. The processor 216 can be further configured to determine a position of the probe relative to the conductive pattern 206 from one or more of the distances determined between the probe 202 and one or more conductive regions 212. For example, the processor 216 can be configured to determine the position by triangulating the distances determined between the probe 202 and one or more conductive regions 212.

Each detected distance between the probe 202 and a conductive region 212 can define a sphere centered at the center of the conductive region 212. The geometry and arrangement of the conductive regions 212 can be known and fixed, e.g., if the conductive pattern 206 is fixed, e.g. printed on the dielectric layer 208 and more or less restricted to a flat surface. In such a case, distances can be detected from the probe 202 to three nearby conductive regions 212 can be estimated from signals measured at the conductive regions. These three distances and the centers of the three corresponding conductive regions define spheres. The three spheres can intersect and share two common intersection points (assuming the distance measurement is sufficiently accurate). Of the two points one is above the plane of the conductive pattern 206, another is below the plane of the conductive pattern 206, the point above is said the target of triangulation. In a degenerate case, there may be a single intersection point at the plane of the conductive pattern 206. Although, in this example, distance measurements are made using three conductive regions 212, a greater or lesser number of measurements may be made. However, making distance measurements to a greater number of conductive regions can result in better stability of the intersection point determined through triangulation.

In other embodiments the processor 216 can be configured to provide an input to a computer program, such as the code 218, based on values of one or more measurements from the capacitance sensor 214. A value of a given measurement can depend on a capacitive coupling of the signal to a corresponding conductive region. In such embodiments, the input can be a location of the probe 202 relative to the conductive pattern 206. In such embodiments, the program can be a game program.

The capacitance sensor 214 may include a plurality of sensors with each sensor being coupled to a different conductive region. Alternatively, the capacitance sensor 214 may include a single sensor that is selectively coupled to each different conductive region 212 through a switch. By way of example, each capacitance sensor 214 may be an alternating current sensor that is sensitive enough to measure an alternating current to a corresponding conductive region as a result of capacitive coupling of the signal to the conductive region.

Figure 3A:
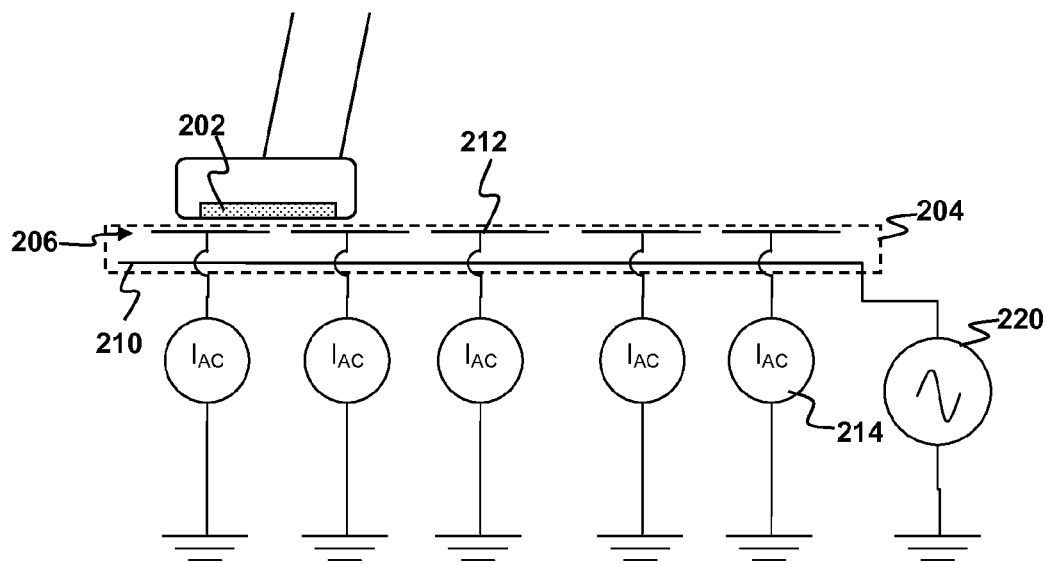
FIGS. 3A-3C are schematic diagrams illustrating alternative implementations of a capacitive interface according to embodiments of the present invention.

The signal that is capacitively coupled to the conductive regions can be a common alternating voltage applied between the common conductive layer and each of the conductive regions in the grid pattern. For example, as shown in FIG. 3A, each conductive region 212 may be coupled to a different corresponding capacitance sensor 214, e.g., an alternating current sensor. An alternating voltage source 220 can apply a common AC voltage to the common conductive layer 210. The probe 202 may include a dielectric material, e.g., characterized by a high dielectric constant. Proximity of the probe to one or conductive regions 212 can affect the signals measured by the corresponding capacitance sensors coupled to those regions through capacitive coupling as discussed above. The processor can determine the relative proximity of the probe to each of the conductive regions 212 by comparing the relative change in the signal from each region to some baseline signal. The position of the probe can be determined through triangulation of the signals. In general, the signal (or signal deviation) will be stronger for the conductive regions 212 that are closest to the probe. In some embodiments the code 218 can be configured to estimate the strongest signal from any of the conductive regions 212 as corresponding to the shortest distance. The code 218 can use this strongest signal to provide an estimate of the z-component of the location of the probe 202.

As may be seen from the foregoing discussion, the apparatus depicted in FIG. 2 may be used to implement a method for receiving an input to a computer program for a computer entertainment device having a capacitive input apparatus coupled to a processor. The capacitive input device can include the mat 204 and a probe 202 configured to be worn on a user's feet. The capacitance sensor 214 can be responsive to a signal that is capacitively coupled to a corresponding one of the conductive regions 212. According to the method a capacitive coupling of the signal with the probe can be changed in a manner wherein a degree of the change of the signal varies with a degree of proximity of the probe to the corresponding one of the conductive regions 212. One or more measurements can be collected from the capacitance sensor 214. A value of a given measurement can depend on a capacitive coupling of the signal to a corresponding conductive region 212. Input can be provided to the computer program 218 based on values of one or more measurements.

Figure 3B:
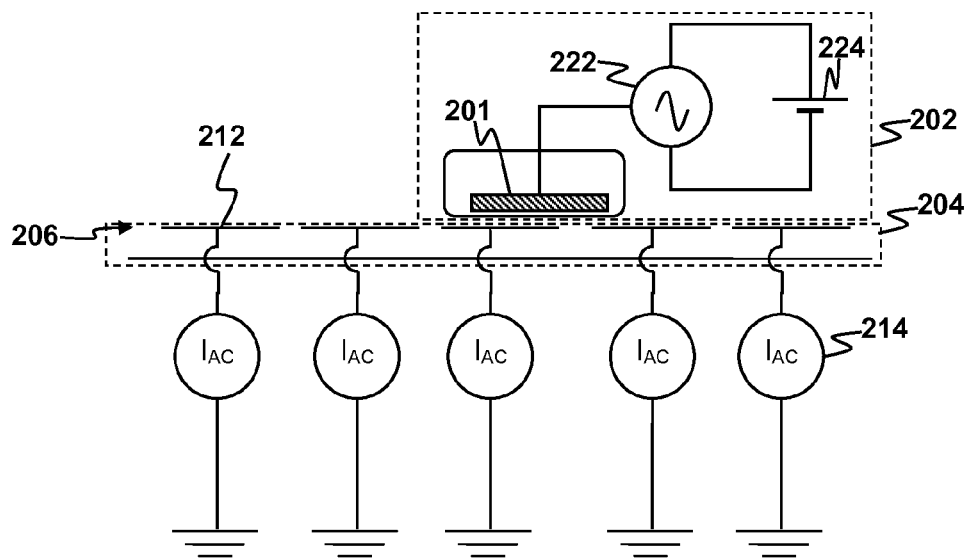

In an alternative embodiment illustrated in FIG. 3B, the probe 202 can be configured to generate the signal that is capacitively coupled to the corresponding one of the conductive regions 212. In such an embodiment, the probe 202 can include an oscillator 222 configured to apply an alternating voltage to a conductor 201 that is part of the probe 202. By way of example, and not by way of limitation, the oscillator 222 may be power by a portable power source 224 such as a battery. The conductor 201, oscillator 222, and power source 224 can be integrated into a unit that can be worn on a user's foot.

Figure 3C:
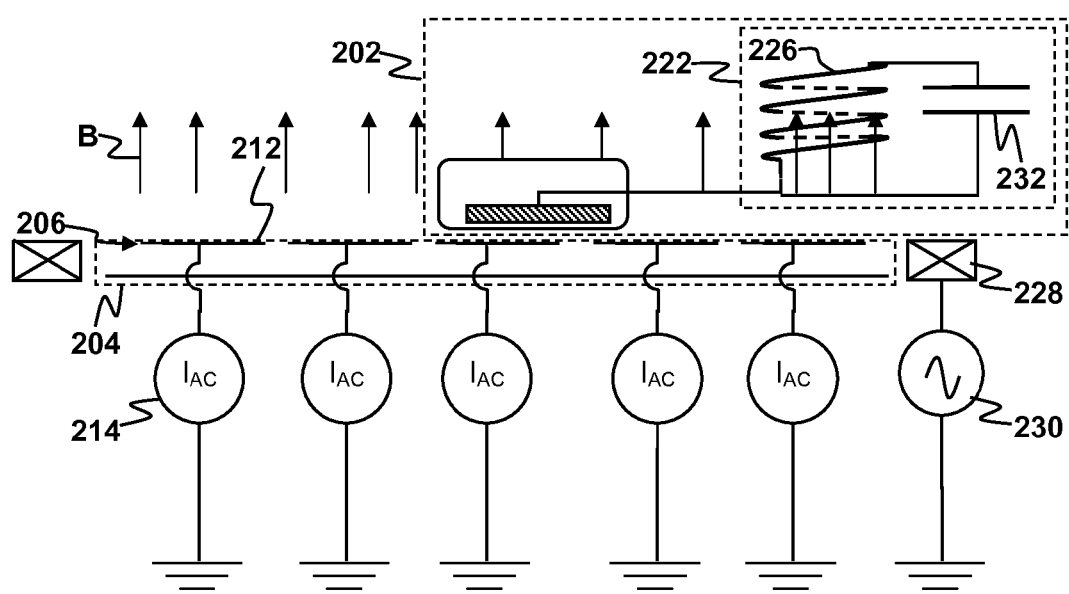

In an alternative embodiment, shown in FIG. 3C, the oscillator 222 can include an inductive coil 226 electrically coupled to the conductor 201. In such a case, the apparatus can include some means for producing an alternating magnetic field B proximate the mat such as a conductive coil 228 that supports an alternating current supplied by an AC source 230. The inductor 226 can be configured to generate an induced voltage in response to the alternating magnetic field and apply the induced voltage to the conductor 201 thereby generating a signal that can be capacitively coupled to the corresponding one of the conductive regions 212 of the pattern 206. The inductive coil 226 can be electrically coupled to a capacitor 232 in a tank circuit characterized by a resonant frequency $f_0$. The resonant frequency may be approximated as $$f_0 = \frac{1}{\sqrt{LC}},$$

where L is the inductance of the coil 226 and C is the capacitance of the capacitor 232. The frequency of the alternating magnetic field can be tuned to be approximately equal to the resonant frequency $f_0$. The alternating magnetic field B produced by the coil 228 AC induces a voltage in the coil 228 which can be used to provide the power to supply the signal to the conductor 201.

Figure 4:
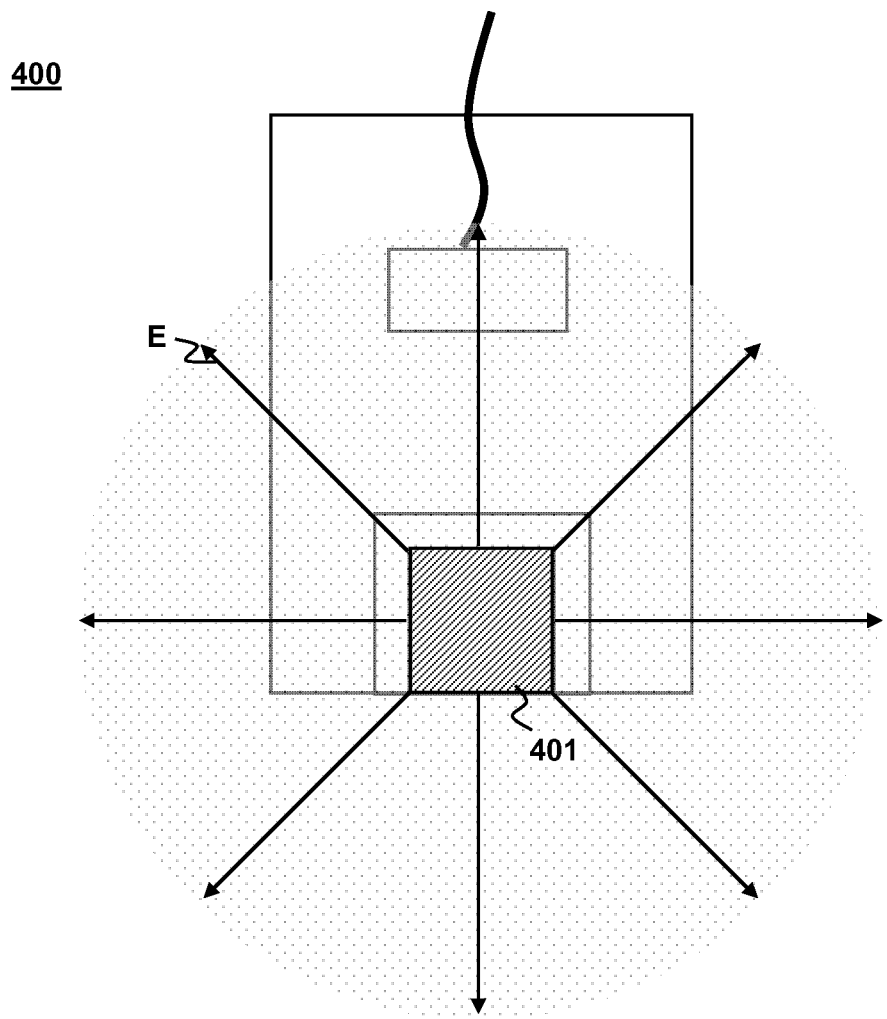
FIG. 4 is a schematic diagram illustrating an unguided field capacitive probe that may be used in conjunction with embodiments of the present invention.

In embodiments such as those illustrated in FIGS. 3A-3C, the probe 202 can further include a second conductor in the form of a shield or guard that is capacitively coupled to the conductor 201. The two conductors can be shaped to guide an electric field towards the conductive regions 212 on the mat. By way of illustration, FIG. 4 depicts an example of an unguided (or unguarded) probe 400 having a single conductor 401. When a voltage is applied to the conductor 401, the electric field from the conductor tends to radiate outward in all directions. This can weaken the effect of capacitive coupling of a signal from the probe 400.

Figure 5:
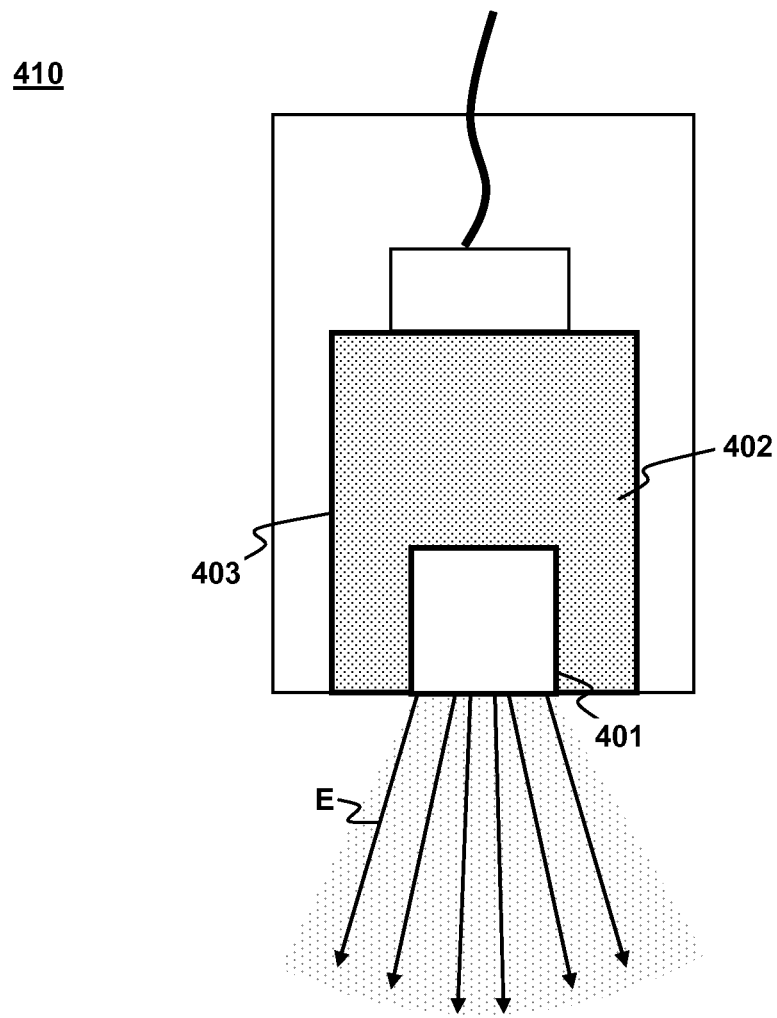
FIG. 5 is a schematic diagram illustrating a guided field capacitive probe that may be used in conjunction with embodiments of the present invention.

To enhance the capacitive coupling from the probe 202, and to allow for more accurate measurements, the electric field from the conductor 201 can be contained within a space between the probe 202 and the mat 204. This can be achieved, e.g., as illustrated in FIG. 5, by adding a capacitive guard in the form of a second conductor 403 around the conductor 401, probe. The guard 403 can be electrically isolated from the first conductor 401 by a dielectric material 402. This guard can be shaped to zero the electric field towards the back and sides of the probe 410. By way of example, and not by way of limitation, the conductors 401, 403 may be in the shape of nested cups with first conductor 401 be smaller and nested within the second conductor 403. The dielectric 402 can occupy a space between the two cup-shaped conductors.

Figure 6:
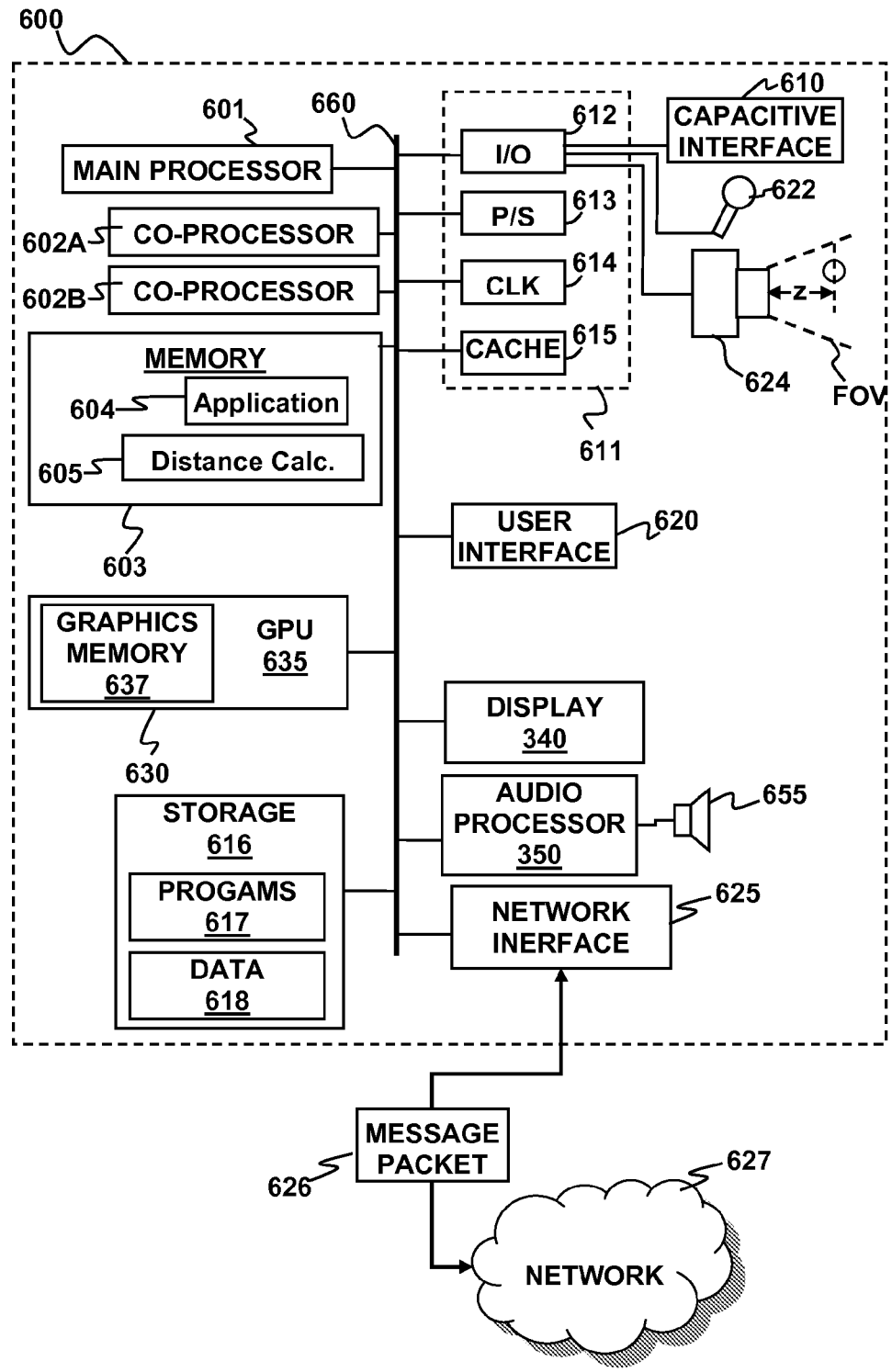
FIG. 6 is a block diagram of a computer apparatus according to an embodiment of the present invention.

A capacitive input apparatus configured in accordance with embodiments of the present invention may be combined with a computer entertainment device in any of a number of ways. By way of example, FIG. 6 is a block diagram illustrating a computer entertainment apparatus 600 utilizing a capacitive input device according to an embodiment of the present invention. By way of example, and without loss of generality, the apparatus 600 may be implemented as part of a computer system, such as a personal computer, video game console, personal digital assistant, cellular telephone, hand-held gaming device, portable internet device or other digital device. In a preferred embodiment, the apparatus is implemented as part of a video game console.

The apparatus 600 generally includes one or more processing units. By way of example, and not by way of limitation, the one or more processing units may include at least one main processing unit 601 and one or more co-processor elements 602A, 602B. Each co-processor element may have a processor unit and an associated local memory. The apparatus can include a memory unit 603 that is separate from the processing unit 601 or co-processor elements 602A, 602B.

The processing unit 601 may include one or more processing cores. By way of example and without limitation, the main processing unit 601 and co-processor elements 602A, 602B may be part of a parallel processor module, such as a Cell Processor. An example of a Cell Processor architecture is described in detail, e.g., in *Cell Broadband Engine Architecture*, copyright International Business Machines Corporation, Sony Computer Entertainment Incorporated, Toshiba Corporation Aug. 8, 2005 a copy of which may be downloaded at http://cell.scei.co.jp/, the entire contents of which are incorporated herein by reference.

In a Cell Processor architecture, the computational unit corresponding to the processing unit 601 is referred to as a "Power Processing Element" (PPE) and the computational units corresponding to the co-processor elements 602A, 602B are referred to as "Synergistic Processing Elements" (SPE). It is noted that a Cell Processor architecture is but one example, among others, of a suitable processor architecture that may be used with embodiments of the invention. However, embodiments of the present invention may be implemented using other multi-processor architectures.

The memory unit 603 may be any suitable medium for storing information in computer readable form. By way of example, and not by way of limitation, the memory unit 603 may include random access memory (RAM) or read only memory (ROM), a computer readable storage disk for a fixed disk drive (e.g., a hard disk drive), or a removable disk drive.

The apparatus 600 may also include well-known support functions 611, such as input/output (I/O) elements 612, power supplies (P/S) 613, a clock (CLK) 614 and cache 615. The apparatus 600 may further include a storage device 616 that provides non-volatile storage for software program instructions 617 and data 618. By way of example, the storage device 616 may be a fixed disk drive, removable disk drive, flash memory device, tape drive, CD-ROM, DVD-ROM, Blu-ray, HD-DVD, UMD, or other optical storage devices.

A capacitive interface 610 can be coupled to the processing unit 601, e.g., via the I/O elements 612. In general, the capacitive interface may include a probe configured to be worn on a user's feet and a mat having a dielectric layer sandwiched between a common conductive layer and a patterned conductive layer. The patterned conductive layer can include a grid pattern containing a plurality of conductive regions. Each conductive region can be selectively coupled to a corresponding capacitance sensor. The capacitance sensor can respond to a signal that is capacitively coupled to a corresponding one of the conductive regions. The probe is configured to change a capacitive coupling of the signal. The degree of change of the capacitive coupling varies with a degree of proximity of the probe to the corresponding one of the conductive regions. By way of example, and not by way of limitation, the capacitive interface 610 may be configured as described above with respect to FIG. 2 and/or FIGS. 3A-3C.

The main processing unit 601 and co-processors 602A, 602B may be configured to run software applications and optionally an operating system. Portions of such software applications may be stored in the memory unit 603. Instructions and data may be loaded into registers of the main processing unit 601 or local stores of the co-processor elements 602A, 602B for execution. The software applications may include a main application 603, such as a video game application. The main application 604 may operate in conjunction with a distance calculation routine 605. In particular, the distance calculation routine 605 can determine a distance between the probe and one or more of the conductive regions on the mat from values of one or more measurements from a capacitance sensor, which may be part of the capacitive interface 610.

The distance calculation routine 605 may trigger the application 604 to change a state of the apparatus 600 when the probe is determined to be in a particular location. As used herein, a "change of state" refers to a change in the operation of the apparatus. By way of example, a change of state may include execution of a command or selection of particular data for use by another process handled by the application 604. A non-limiting example of execution of a command would be for the apparatus to begin the process of comparing the position of the probe to a predetermined position for the probe at a particular time. A score may be calculated based on the how proximity of the probe position to the predetermined position. A sequence of predetermined positions may be established with respect to a particular time reference, such as a time reference within a piece of music that is playing in conjunction with the program 604. By sequentially comparing the probe position the predetermined positions at the relevant times, the apparatus 600 may continuously track the position of the user's feet as the user dances on the mat. The program can score the user based on how closely the user follows a predetermined sequence of dance steps selected for a given piece of music.

The apparatus 600 may include a network interface 625 to facilitate communication via an electronic communications network 627. The network interface 625 may be configured to implement wired or wireless communication over local area networks and wide area networks such as the Internet. The system 600 may send and receive data and/or requests for files via one or more message packets 626 over the network 627.

The apparatus 600 may further comprise a graphics subsystem 630, which may include a graphics processing unit (GPU) 635 and graphics memory 637. The graphics memory 637 may include a display memory (e.g., a frame buffer) used for storing pixel data for each pixel of an output image. The graphics memory 637 may be integrated in the same device as the GPU 635, connected as a separate device with GPU 635, and/or implemented within the memory unit 603. Pixel data may be provided to the graphics memory 637 directly from the processing unit 601 and/or or co-processors 602A, 602B. In some embodiments, the graphics unit may receive a video signal data extracted from a digital broadcast signal decoded by a decoder (not shown). Alternatively, the processing unit 601 may provide the GPU 635 with data and/or instructions defining the desired output images, from which the GPU 635 may generate the pixel data of one or more output images. The data and/or instructions defining the desired output images may be stored in memory 602 and/or graphics memory 637. In an embodiment, the GPU 635 may be configured (e.g., by suitable programming or hardware configuration) with 3D rendering capabilities for generating pixel data for output images from instructions and data defining the geometry, lighting, shading, texturing, motion, and/or camera parameters for a scene. The GPU 635 may further include one or more programmable execution units capable of executing shader programs.

The graphics subsystem 630 may periodically output pixel data for an image from the graphics memory 637 to be displayed on a video display device 640. The video display device 650 may be any device capable of displaying visual information in response to a signal from the apparatus 600, including CRT, LCD, plasma, and OLED displays that can display text, numerals, graphical symbols or images. The digital broadcast receiving device 600 may provide the display device 640 with a display driving signal in analog or digital form, depending on the type of display device. In addition, the display 640 may be complemented by one or more audio speakers that produce audible or otherwise detectable sounds. To facilitate generation of such sounds, the apparatus 600 may further include an audio processor 650 adapted to generate analog or digital audio output from instructions and/or data provided by the processing unit 601, memory unit 602, and/or storage 616. The audio output may be converted to audible sounds, e.g., by a speaker 655.

The components of the apparatus 600, including the main processing unit 601, co-processor elements 602A, 602B, capacitive interface 610, support functions 611, data storage 616, conventional user input devices 620 such as a game controller, keyboard, or mouse, network interface 625, graphics subsystem 630 and audio processor 650 may be operably connected to each other via one or more data buses 660. These components may be implemented in hardware, software or firmware or some combination of two or more of these.

Embodiments of the present invention are usable with applications or systems that utilize a camera, which may be a depth camera, sometimes also known as a 3D camera or zed camera. By way of example, and not by way of limitation, the apparatus 600 may optionally include a microphone 622 and a camera 624, which may be a depth camera, sometimes also known as a 3D camera or zed camera. The microphone 622 and camera 624 may be coupled to the data bus via the I/O functions. The main application 604 may analyze images obtained with the camera to determine information relating to the location of persons or objects within a field of view FOV of the camera 624. The location information can include a depth z of such persons or objects. The main application 604 may use the location information in conjunction with information from the capacitive interface as described above to obtain information regarding the location of the user and information regarding the orientation of the user's body. This information may be used to provide additional inputs to the application 604.

Embodiments of the invention allow for a greater degree of resolution in tracking the position of the user's feet than is possible with a conventional prior art dance mat.

In addition, embodiments of the invention also allow first and second order differentiation with respect to time of the relative position of the feet. Such differentiation can be used to determine the velocity and acceleration of the feet. For articulated open-chain bodies, such velocity and acceleration information is useful to help further estimate full body motion beyond feet by means of inverse kinematics or trajectory planning.

Furthermore, embodiments of the present invention may be useful in applications beyond gaming. For example, in a robot technology application the probe 202 may be incorporated into a robot and an entire room or other area may be covered by a conductive pattern 206. The robot can use the capacitive position determination technique described above to move about the room based on AI.

The reader's attention is directed to all papers and documents which are filed concurrently with this specification and which are open to public inspection with this specification, and the contents of all such papers and documents incorporated herein by reference.

All the features disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. A capacitive input apparatus for a computer entertainment device, comprising:
   a mat having a dielectric layer sandwiched between a common conductive layer and a patterned conductive layer, wherein the patterned conductive layer includes a grid pattern containing a plurality of conductive regions, wherein each conductive region is selectively coupled to a corresponding capacitance sensor, wherein the capacitance sensor is responsive to a signal that is capacitively coupled to a corresponding one of the conductive regions;
   a probe configured to change a capacitive coupling of the signal, wherein a degree of the change of the signal varies with a degree of proximity of the probe to the corresponding one of the conductive regions.

2. The apparatus of claim 1, wherein the signal that is capacitively coupled to the conductive regions is a common alternating voltage applied between the common conductive layer and each of the conductive regions in the grid pattern.

3. The apparatus of claim 2, wherein the probe includes a dielectric material, wherein the capacitive sensor is configured to detect a change in a capacitance between the corresponding conductive region and the common conductive layer due to a proximity of the dielectric material to the corresponding conductive region.

4. The apparatus of claim 1, wherein the signal that is capacitively coupled to the conductive regions is an alternating current to one or more of the conductive regions resulting from a common alternating voltage applied between the common conductive layer and each of the conductive regions in the grid pattern.

5. The apparatus of claim 4, wherein the probe includes a dielectric material, wherein the capacitive sensor is configured to detect a change in the alternating current due to a proximity of the dielectric material to the corresponding conductive region.

6. The apparatus of claim 1 wherein the probe is configured to generate the signal that is capacitively coupled to the corresponding one of the conductive regions.

7. The apparatus of claim 6, wherein the probe includes an oscillator configured to apply an alternating voltage to a first conductor.

8. The apparatus of claim 7, wherein the probe further includes a second conductor capacitively coupled to the first conductor, wherein the first and second conductors are shaped to guide an electric field towards the conductive regions on the mat.

9. The apparatus of claim 7 wherein the oscillator includes an inductive coil electrically coupled to the first conductor.

10. The apparatus of claim 8, further comprising means for producing an alternating magnetic field proximate the mat, wherein the inductor is configured to generate an induced voltage in response to the alternating magnetic field and apply the induced voltage to the first conductor thereby generating the signal that is capacitively coupled to the corresponding one of the conductive regions of the grid pattern.

11. The apparatus of claim 8 wherein the inductive coil is electrically coupled to a capacitor in a tank circuit, wherein the tank circuit is characterized by a resonant frequency, wherein a frequency of the alternating magnetic field is approximately equal to the resonant frequency.

12. The apparatus of claim 1, further comprising a processor coupled to the capacitance sensor, wherein the processor is configured to determine a distance between the probe and one or more of the conductive regions from values of one or more measurements from the capacitance sensor wherein a value of a given measurement depends on a capacitive coupling of the signal to a corresponding conductive region.

13. The apparatus of claim 11 wherein the processor is further configured to determine a position of the probe relative to the grid pattern from one or more of the distances determined between the probe and one or more conductive regions.

14. The apparatus of claim 11 wherein the processor is configured to determine the position by triangulating the distances determined between the probe and one or more conductive regions.

15. The apparatus of claim 1, further comprising a processor coupled to the capacitance sensor, wherein the processor is configured to provide an input to a computer program based on values of one or more measurements from the capacitance sensor wherein a value of a given measurement depends on a capacitive coupling of the signal to a corresponding conductive region.

16. The apparatus of claim 15, wherein the input is a location of the probe relative to the grid pattern.

17. The apparatus of claim 15 wherein the program is a game program.

18. The apparatus of claim 1, wherein the probe is configured to be worn on one or more of a user's feet.

19. A method for receiving an input to a computer program for a computer entertainment device having a capacitive input apparatus coupled to a processor, wherein the capacitive input device includes a mat and a probe, wherein the mat has a dielectric layer sandwiched between a common conductive layer and a patterned conductive layer, wherein the patterned conductive layer includes a grid pattern containing a plurality of conductive regions, wherein each conductive region is selectively coupled to a corresponding capacitance sensor, wherein the capacitance sensor is responsive to a signal that is capacitively coupled to a corresponding one of the conductive regions, the method comprising:
    changing a capacitive coupling of the signal with the probe, wherein a degree of the change of the signal varies with a degree of proximity of the probe to the corresponding one of the conductive regions;
    collecting one or more measurements from the capacitance sensor, wherein a value of a given measurement depends on a capacitive coupling of the signal to a corresponding conductive region; and
    providing the input to the computer program based on values of one or more measurements.

20. The method of claim 19, wherein the signal that is capacitively coupled to the conductive regions is a common alternating voltage applied between the common conductive layer and each of the conductive regions in the grid pattern.

21. The method of claim 20, wherein the probe includes a dielectric material, wherein the capacitive sensor is configured to detect a change in a capacitance between the corresponding conductive region and the common conductive layer due to a proximity of the dielectric material to the corresponding conductive region.

22. The method of claim 19, wherein the signal that is capacitively coupled to the conductive regions is an alternating current to one or more of the conductive regions resulting from a common alternating voltage applied between the common conductive layer and each of the conductive regions in the grid pattern.

23. The method of claim 22, wherein the probe includes a dielectric material, wherein the capacitive sensor is configured to detect a change in the alternating current due to a proximity of the dielectric material to the corresponding conductive region.

24. The method of claim 19 wherein the probe is configured to generate the signal that is capacitively coupled to the corresponding one of the conductive regions.

25. The method of claim 24, wherein the probe includes an oscillator configured to apply an alternating voltage to a first conductive conductor.

26. The method of claim 25, wherein the probe further includes a second conductor capacitively coupled to the first conductor, wherein the first and second conductors are shaped to guide an electric field towards the conductive regions on the mat.

27. The method of claim 25 wherein the oscillator includes an inductive coil electrically coupled to the first conductor.

28. The method of claim 27, further comprising producing an alternating magnetic field proximate the mat, wherein the inductor is configured to generate an induced voltage in response to the alternating magnetic field and apply the induced voltage to the first conductor thereby generating the signal that is capacitively coupled to the corresponding one of the conductive regions of the grid pattern.

29. The method of claim 28 wherein the inductive coil is electrically coupled to a capacitor in a tank circuit, wherein the tank circuit is characterized by a resonant frequency, wherein a frequency of the alternating magnetic field is approximately equal to the resonant frequency.

30. The method of claim 19, further comprising determining a distance between the probe and one or more of the conductive regions with the processor from values of one or more measurements from the capacitance sensor wherein a value of a given measurement depends on a capacitive coupling of the signal to a corresponding conductive region.

31. The method of claim 30, further comprising determining a position of the probe relative to the grid pattern with the processor from one or more of the distances determined between the probe and one or more conductive regions.

32. The method of claim 30, further comprising determining the position with the processor by triangulating the distances determined between the probe and one or more conductive regions.

33. The method of claim 19 wherein the probe is configured to be worn on a user's foot.

\* \* \* \* \*